United States Patent
Yamamoto et al.

(10) Patent No.: US 9,511,671 B2
(45) Date of Patent: Dec. 6, 2016

(54) DEVICE FOR RESTRICTING VEHICLE MOVEMENT DURING CONNECTION WITH CHARGING CABLE

(71) Applicant: Nissan Motor Co., Ltd., Kanagawa (JP)

(72) Inventors: Naoki Yamamoto, Tokyo (JP); Ken Nakayama, Kanagawa (JP); Isamu Kazama, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/381,999

(22) PCT Filed: Feb. 21, 2013

(86) PCT No.: PCT/JP2013/054285
§ 371 (c)(1),
(2) Date: Aug. 29, 2014

(87) PCT Pub. No.: WO2013/129218
PCT Pub. Date: Sep. 6, 2013

(65) Prior Publication Data
US 2015/0057859 A1 Feb. 26, 2015

(30) Foreign Application Priority Data

Feb. 29, 2012 (JP) ................................. 2012-042880

(51) Int. Cl.
*B60L 9/00* (2006.01)
*B60L 11/00* (2006.01)
(Continued)

(52) U.S. Cl.
CPC ............ *B60L 11/1809* (2013.01); *B60L 1/003* (2013.01); *B60L 3/00* (2013.01); *B60L 3/0076* (2013.01);
(Continued)

(58) Field of Classification Search
CPC ... Y02T 10/7216; Y02T 90/16; Y02T 10/92; Y02T 90/169; Y02T 90/12; Y02T 90/34; Y02T 10/6217; Y02T 10/7275; Y02T 90/122; Y02T 90/128; Y02T 90/163; Y02T 10/7083; B60L 11/1844; B60L 11/182; B60L 11/185; B60L 11/184; B60L 1/003; B60L 3/003; B60L 2230/12; B60L 11/1846; B60L 1/1818; B60L 1/1824
USPC ...... 701/22, 1, 32.3, 34.4, 36, 101, 110, 116
See application file for complete search history.

(56) References Cited

U.S. PATENT DOCUMENTS 5,610,814 A * 3/1997 Sugioka .................... B60L 3/00
                                                      180/273
7,791,217 B2 * 9/2010 Kamaga .............. B60L 11/1816
                                                      307/10.1
(Continued)

FOREIGN PATENT DOCUMENTS

JP  2006-14543 A  1/2006
JP  2007-43874 A  2/2007
(Continued)

OTHER PUBLICATIONS

International Search Report for corresponding International Application No. PCT/JP2013/054285, mailed May 14, 2013 (5 pages).
(Continued)

*Primary Examiner* — Calvin Cheung
*Assistant Examiner* — Luis A Martinez Borrero
(74) *Attorney, Agent, or Firm* — Osha Liang LLP (57) ABSTRACT

A device for restricting movement of a vehicle during connection of a charging cable, the vehicle being equipped with a battery chargeable from an external power source via the charging cable, the device including a charging cable connection detecting section that detects that the charging cable is in a connection state, a vehicle body movement detecting section that detects movement of a vehicle body of the vehicle based on moving speed and moving distance of the vehicle, and a braking section that brakes the vehicle when the movement of the vehicle body is detected while the charging cable is in the connection state based on signals from the charging cable connection detecting section and the vehicle body movement detecting section.

7 Claims, 8 Drawing Sheets

(51) Int. Cl.
*G05D 1/00* (2006.01)
*G05D 3/00* (2006.01)
*G06F 7/00* (2006.01)
*G06F 17/00* (2006.01)
*B60L 11/18* (2006.01)
*B60T 7/12* (2006.01)
*B60T 17/18* (2006.01)
*B60L 1/00* (2006.01)
*B60L 3/00* (2006.01)

(52) U.S. Cl.
CPC .......... *B60L 11/1803* (2013.01); *B60L 11/185* (2013.01); *B60L 11/1816* (2013.01); *B60L 11/1846* (2013.01); *B60L 11/1861* (2013.01); *B60L 11/1868* (2013.01); *B60L 11/1875* (2013.01); *B60T 7/12* (2013.01); *B60T 17/18* (2013.01); *B60L 2210/10* (2013.01); *B60L 2240/12* (2013.01); *B60L 2240/36* (2013.01); *B60L 2240/486* (2013.01); *B60L 2240/545* (2013.01); *B60L 2240/80* (2013.01); *B60L 2250/10* (2013.01); *B60L 2250/24* (2013.01); *B60L 2250/26* (2013.01); *Y02T 10/7005* (2013.01); *Y02T 10/7044* (2013.01); *Y02T 10/7066* (2013.01); *Y02T 10/7072* (2013.01); *Y02T 10/7216* (2013.01); *Y02T 90/121* (2013.01); *Y02T 90/127* (2013.01); *Y02T 90/128* (2013.01); *Y02T 90/14* (2013.01); *Y02T 90/169* (2013.01); *Y04S 30/14* (2013.01)

(56) References Cited

U.S. PATENT DOCUMENTS

| | | | | |
|---|---|---|---|---|
| 9,197,074 | B2* | 11/2015 | Nakamura | H02G 11/006 |
| 2003/0236601 | A1 | 12/2003 | McLeod et al. | |
| 2009/0184833 | A1* | 7/2009 | Tonegawa | G01C 21/32 340/636.2 |
| 2010/0204860 | A1* | 8/2010 | Mitsutani | B60K 6/365 701/22 |
| 2010/0241299 | A1* | 9/2010 | Ito | B60L 11/1818 701/22 |
| 2010/0320018 | A1* | 12/2010 | Gwozdek | B60T 17/18 180/65.27 |
| 2011/0178663 | A1* | 7/2011 | Crombez | B60K 28/10 701/22 |
| 2011/0196545 | A1* | 8/2011 | Miwa | B60K 6/445 700/292 |
| 2011/0227714 | A1* | 9/2011 | Kamaga | B60K 6/445 340/438 |
| 2013/0110340 | A1* | 5/2013 | Park | B60L 11/1816 701/22 |
| 2013/0332019 | A1* | 12/2013 | Goto | F16H 61/22 701/22 |
| 2014/0159659 | A1* | 6/2014 | Nosaka | B60L 11/1838 320/109 |
| 2014/0210412 | A1* | 7/2014 | Lowenthal | B60L 11/1816 320/109 |
| 2014/0217813 | A1* | 8/2014 | Kinomura | B60L 1/006 307/10.1 |
| 2014/0232182 | A1* | 8/2014 | Kinomura | B60L 11/123 307/10.1 |
| 2014/0232355 | A1* | 8/2014 | Masuda | B60L 3/0069 320/137 |
| 2014/0253036 | A1* | 9/2014 | Kinomura | H02J 7/0004 320/109 |
| 2014/0306658 | A1* | 10/2014 | Kinomura | B60L 11/1838 320/109 |
| 2014/0333262 | A1* | 11/2014 | Ochiai | B60L 11/1838 320/109 |
| 2014/0371962 | A1* | 12/2014 | Smith | B60L 11/1824 701/22 |
| 2015/0037994 | A1* | 2/2015 | Nakajima | H01R 13/6397 439/304 |
| 2015/0066257 | A1* | 3/2015 | Ochocinski | B60K 28/066 701/22 |

FOREIGN PATENT DOCUMENTS

| | | |
|---|---|---|
| JP | 2009-118658 A | 5/2009 |
| JP | 2010-226840 A | 10/2010 |
| JP | 2011-098575 A | 5/2011 |
| JP | 2012-228962 A | 11/2012 |
| WO | 2011/139680 A2 | 11/2011 |

OTHER PUBLICATIONS

Written Opinion for corresponding International Application No. PCT/JP2013/054285, mailed May 14, 2013 (6 pages).
International Preliminary Report for Patentability for corresponding International Application No. PCT/JP2013/054285, mailed Jul. 31, 2013 (12 pages).

* cited by examiner

DEVICE FOR RESTRICTING VEHICLE MOVEMENT DURING CONNECTION WITH CHARGING CABLE

BACKGROUND

Technical Field

The present invention relates to a device for restricting movement of a vehicle equipped with a battery chargeable from an external power source via a charging cable during connection of the charging cable.

Related Art

A battery as a vehicle-mounted power supply is essential to a vehicle such as an automobile, and a vehicle-mounted battery must be charged.

Upon charging the vehicle-mounted battery on a vehicle which is charged from an external power source, as is known in an electric vehicle and a plug-in hybrid vehicle, a charging gun of a charging cable provided on either one side of the external power source or the vehicle (usually on the side of the external power source) is inserted into a charging port provided on either one side of the vehicle or the external power source (usually on the side of the vehicle) so that the charging cable is connected with the vehicle or the external power source and the vehicle-mounted battery is charged from the external power source via the charging cable.

Upon charging the vehicle-mounted battery as described above, usually, a driver once exits from the vehicle and carries out a connecting work of the charging cable.

At this time, the driver must bring the vehicle into a non-movable state by shifting to a parking position (P range) in which rotation of a drive axle is locked and carry out the above connecting work of the charging cable in the non-movable state.

However, if the driver exits from the vehicle while forgetting shifting to the parking position (P range) and carries out the connecting work of the charging cable, the vehicle occasionally may be allowed to move by a component of force of gravity in such a case that the vehicle is stopped on a slope (inclined surface). With such a movement of the vehicle, during charging the battery, the charging cable extending between the vehicle and the external power source may be damaged.

Therefore, conventionally, for instance, as recited in Patent Literature 1, there has been proposed a measure to hold the vehicle in a braking state by an operation of a brake actuator while a shift position is not a parking position (P range), that is, when the shift position is a stop position (N range), a forward running position (D range) or a reverse running position (R range).

According to the technology proposed, even when the driver carries out the connecting work of the charging cable while forgetting shifting to the parking position (P range), the vehicle is held in the braking state by the operation of the brake actuator and prevented from moving in a direction along the slope so that the charging cable can be free from damage.

CITATION LIST

Patent Literature

Patent Literature 1: Japanese Patent Application Unexamined Publication No. 2009-118658 A

SUMMARY

However, in a case where the above-described conventional technology is adopted, the vehicle is immediately brought into the braking state by the operation of the brake actuator on the basis of a condition that a shift position is the stop position (N range), the forward running position (D range) or the reverse running position (R range) other than the parking position (P range). Therefore, when the driver carries out the connecting work of the charging cable while forgetting shifting to the parking position (P range), the vehicle is held in the braking state, and therefore, can be prevented from moving even when the vehicle is located on a slope.

Accordingly, when the driver exits from the vehicle in order to carry out the connecting work of the charging cable, the driver cannot notice that the driver forgets shifting to the parking position (P range). As a result, there is a fear that the driver carries out the connecting work of the charging cable and charge the vehicle-mount battery using electric power from the external power source while the driver is unnoticed about forgetting the shifting to the parking position (P range).

Thus, in a case where charging is carried out without being noticed that the shifting to the parking position (P range) is forgotten, the brake actuator is continuously held in the operated state during the charging in response to the condition that the shift position is a position other than the parking position (P range).

Such a continuous operation of the brake actuator causes overheating of the brake actuator to thereby deteriorate a braking performance at worst, so that the vehicle cannot be held in the braking state.

At this time, in a case where the vehicle is located on a slope, the vehicle is allowed to move in a direction along the slope due to gravity. Thus, the primary object cannot be attained.

Further, even though no overheating of the brake actuator occurs when the driver forgets the shifting to the parking position (P range), a charging time and a charging cost are increased by an amount of electric power consumption due to the above-described continuous operation of the brake actuator.

The present invention was made from the viewpoint that the charging cable can be protected from damage even in a case where there is provided a device configured to carry out braking of the vehicle in accordance with the presence of movement of the vehicle body, and from the viewpoint that according to the device, the driver can be alerted that the shifting to the parking position (P range) is forgotten in accordance with the movement of the vehicle body, and urged to carry out the shifting to the parking position (P range), and the driver can be prevented from carrying out charging without noticing that the shifting to the parking position (P range) is forgotten.

One or more embodiments of the present invention provides a device for restricting movement of a vehicle during connection of a charging cable for a battery which is capable of solving the above-described various problems by embodying the above concept.

A device for restricting movement of a vehicle during connection of a charging cable, according to one or more embodiments of the present invention is configured as follows.

Firstly, the present invention is based on such a premise that the vehicle is equipped with a battery chargeable from an external power source via a charging cable.

The present invention is characterized by a configuration including a charging cable connection detecting section, a vehicle body movement detecting section and a braking section as explained below.

The charging cable connection detecting section is configured to detect that the charging cable is in a connection state, and the vehicle body movement detecting section is configured to detect movement of a vehicle body of the vehicle based on moving speed and moving distance of the vehicle.

Further, the braking section is configured to brake the vehicle when the movement of a vehicle body is detected while the charging cable is in the connection state, based on signals from the charging cable connection detecting section and the vehicle body movement detecting section.

The device for restricting movement of a vehicle during connection of a charging cable, according to the present invention is configured so as to brake the vehicle when movement of a vehicle body is detected while the charging cable is in the connection state.

With this configuration, it is possible to restrain the vehicle body from continuously move on a slope or the like in spite of the charging cable being in the connection state due to forgetting shifting to the parking position (P range), and the charging cable suffers from damage.

Further, the driver can notice that the shifting to the parking position (P range) is forgotten in accordance with the movement of the vehicle body which occurs until the time at which the vehicle is stopped by braking as described above, and can carry out the shifting to the parking position (P range).

Accordingly, the driver can be prevented from carrying out the charging without noticing that the shifting to the parking position (P range) is forgotten. It is possible to avoid a continuous braking operation due to the charging conducted in a condition that the shifting to the parking position (P range) is forgotten. Further, it is possible to avoid the above problem relating to overheating of the brake actuator and the above problems that a charging time is prolonged and a charging cost is increased.

DETAILED DESCRIPTION

In the following, embodiments of the present invention are explained by referring to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiment 1

<Configuration>

Figure 1:
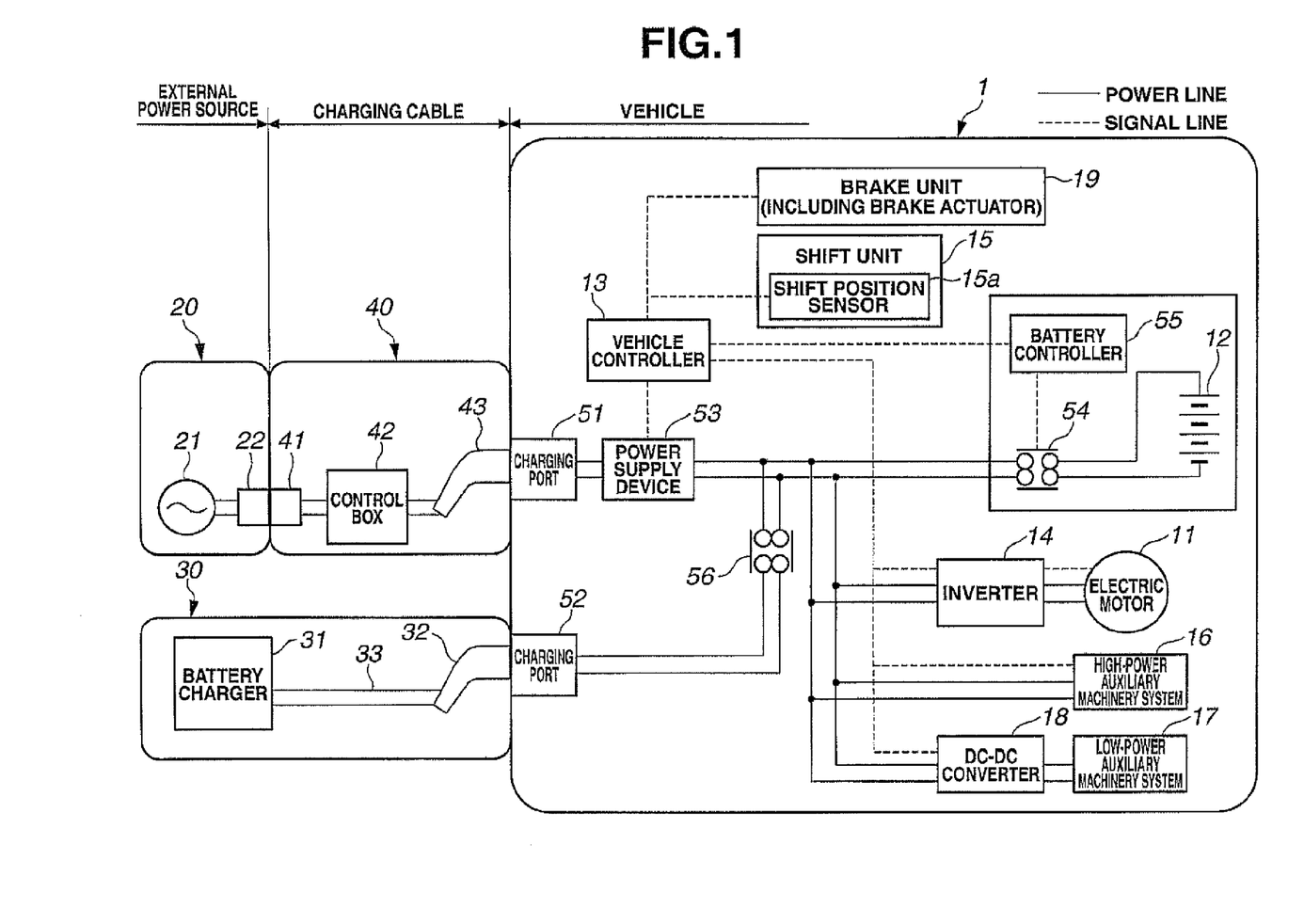
FIG. 1 is a schematic system diagram showing a whole control system of an electric vehicle equipped with a device for restricting movement of a vehicle during connection of a charging cable, according to an embodiment of the present invention, together with a battery charging system.

FIG. 1 is a schematic system diagram showing a whole control system of electric vehicle 1 equipped with a device for restricting movement of a vehicle during connection of a charging cable, according to an embodiment of the present invention, together with a battery charging system.

Electric vehicle 1 is equipped with electric motor 11 as a power source which drives road wheels (not shown) so as to allow electric vehicle 1 to run.

Electric motor 11 is supplied with electric power from high-power battery 12 as an electric power source which is controlled by vehicle controller 13 via inverter 14, and drives the road wheels (not shown) by torque corresponding to the electric power supplied.

Vehicle controller 13 executes control of the electric power supplied to electric motor 11 via inverter 14 based on a shift position of shift unit 15 which is manually operated by a driver in accordance with a running form, that is, a parking position (P range), a reverse running position (R range), a stop position (N range) and a forward running position (D range).

Since the present invention does not relate to the control of the electric power supplied to electric motor 11, a detailed explanation thereof is omitted. Based on a signal from shift position sensor 15a that detects these shift positions of shift unit 15, in a case where the parking position (P range) is selected, vehicle controller 13 allows electric vehicle 1 to be in a parking state by setting the electric power to be supplied to electric motor 11 to 0 and cooperating with a parking lock mechanism (not shown) that is mechanically actuated in response to the shift operation to lock rotation of the road wheels.

In a case where the reverse running position (R range) is selected, vehicle controller 13 allows electric vehicle 1 to reversely run by controlling the electric power to be supplied to electric motor 11 to be in a vehicle reverse (reverse rotation) direction and controlling a magnitude of the electric power to be supplied to electric motor 11 in accordance with an amount of depression of an accelerator pedal (not shown).

In a case where the stop position (N range) is selected, vehicle controller 13 allows electric vehicle 1 to be in a stop state by setting the electric power to be supplied to electric motor 11 to 0.

Further, in a case where the forward running position (D range) is selected, vehicle controller 13 allows electric vehicle 1 to forwardly runs by controlling the electric power to be supplied to electric motor 11 to be in a vehicle forward (positive rotation) direction and controlling a magnitude of the electric power to be supplied to electric motor 11 in accordance with an amount of depression of the accelerator pedal (not shown).

Electric vehicle 1 includes high-power auxiliary machinery system 16, such as an air conditioner, and low-power auxiliary machinery system 17, such as 12V battery, various lamps, a wiper, etc. High-power auxiliary machinery system 16 is directly driven by electric power from high-power battery 12, and low-power auxiliary machinery system 17 is driven by electric power that is produced by decreasing electric voltage from high-power battery 12 by DC-DC converter 18.

High-power battery 12 is chargeable by external power source 20 provided at home, etc., or external charging device 30 provided at a charging station, etc.

External power source 20 includes commercial power source 21 and power receptacle 22 connected to commercial power source 21. Charging cable 40 is connected to power receptacle 22.

Charging cable 40 includes power plug 41 that is inserted to power receptacle 22 so as to connect one end of charging cable 40 to power receptacle 22, control box 42 disposed in a substantially intermediate portion of charging cable 40, and charging gun 43 connected to the other end of charging cable 40.

External charging device 30 includes battery charger 31 provided on a charging station, etc., and charging cable 33 extending from battery charger 31 to charging gun 33.

Electric vehicle 1 is provided with charging ports 51, 52 into which charging guns 43, 32 are inserted to be connected with charging cables 40, 33, respectively. One charging port 51 is connected with battery 12 via power supply device 53 and battery relay 54 in sequence.

Power supply device 53 is configured to transform electric power supplied from external power source 20 (through charging cable 40 and charging port 51) under control of vehicle controller 13 and raise voltage, thereby serving for charging of battery 12.

Battery relay 54 is opened and closed by battery controller 55 in response to a command from vehicle controller 13.

Battery controller 55 is also configured to monitor a state of charge and a temperature of battery 12 to thereby restrict charging/discharging of battery 12 and execute heating control of battery 12 at extremely low temperatures.

Charging port 52 is connected to battery 12 via charging relay 56 and battery relay 54 in sequence.

Electric vehicle 1 includes brake unit 19. Brake unit 19 is operated by a brake hydraulic pressure according to depression of a brake pedal and applies a braking force to the vehicle to thereby brake the vehicle.

<Vehicle Movement Restriction Control During Connection of Charging Cable>

The above brake unit 19 is configured not only to be operated in accordance with a brake pedal effort as described above but also to be operated by a brake actuator (not shown) irrespective of a brake pedal operation.

The brake unit (brake actuator) 19 is also used to restrict movement of electric vehicle 1 by braking electric vehicle 1 in a connection state of charging cable 40 (33) in which charging gun 43 (32) is inserted into charging port 51 (52).

Upon conducting such vehicle movement restriction control during connection of the charging cable, vehicle controller 13 executes a control program shown in FIG. 2 and executes braking force control via brake unit 19 (brake actuator) as follows.

Firstly, in step S11, it is determined whether or not charging cable 40 (33) is connected to charging port 51 (52). In step S12, it is determined whether or not a shift position selected with shift unit 15 is other than the parking position (P range).

Accordingly, step S11 corresponds to a charging cable connection detecting section.

When in step S1, it is determined that charging cable 40 (33) is not connected to charging port 51 (52), or when in step S12, it is determined that the shift position is the parking position (P range), the charging cable is not in the connection state, or the vehicle cannot move because the shift position is the parking position (P range) even when the charging cable is in the connection state. Therefore, in these cases, it is not necessary to execute the vehicle movement restriction control, and the vehicle movement restriction control is ended.

When in step S11, it is determined that charging cable 40 (33) is connected to charging port 51 (52), and when in step S12, it is determined that the shift position is other than the parking position (P range), the charging cable is in the connection state, and the vehicle can move because the shift position is other than the parking position (P range). Therefore, for the purpose of preventing damage to the charging cable or the like, the logic flow proceeds to step S13 and after and executes the braking force control for restricting movement of the vehicle via brake unit 19 (brake actuator) as follows.

In step S13, monitoring of vehicle body moving speed (vehicle speed) VSP and vehicle body moving distance L is started. In next step S14, it is determined whether or not a vehicle body moving state at present necessitates the braking force control for restricting movement of the vehicle, by comparing the vehicle body moving speed VSP and the vehicle body moving distance L with predetermined vehicle speed VSPs and predetermined distance Ls1, respectively.

That is, in step S14, when the condition of VSP≥VSPs or the condition of L≥Ls1 is satisfied, it is determined that a vehicle body moving state at present necessitates the braking force control for restricting movement of the vehicle, and the logic flow proceeds to step S16 through step S21 in sequence.

In step S14, when the condition of VSP□VSPs and the condition of L□Ls1 is satisfied, it is determined that a vehicle body moving state at present does not necessitate the braking force control for restricting movement of the vehicle, and the logic flow skips step S16 through step S21 and proceeds to step S22.

Accordingly, step S14 corresponds to a vehicle body movement detecting section of the present invention.

In step S22, it is determined whether or not one of the following conditions (1) to (3) is satisfied.

(1) The shift position is the parking position (P range).
(2) The vehicle is braked by depressing the brake pedal.
(3) The parking brake is in an operating state.

Any of these conditions is a condition of the driver's operation for bringing the vehicle into a stopped state. If at least one of these conditions (1) to (3) is satisfied, the vehicle is prevented from moving, and the braking force control for restricting movement of the vehicle is not necessary.

Therefore, in a case where in step S22, it is determined that one of the conditions (1) to (3) is satisfied, the logic flow proceeds to step S23. In step S23, if the braking force control for restricting movement of the vehicle is during execution, the braking force control for restricting movement of the vehicle is cancelled.

However, when in step S22, it is determined that all of the conditions (1) to (3) are not satisfied, the vehicle is moveable and the braking force control for restricting movement of the vehicle is necessary. Therefore, the logic flow goes back to step S14 in which the braking force control for restricting movement of the vehicle is executed as follows.

Specifically, among step S16 to step S21 which are sequentially selected when in step S14, it is determined that the condition of VSP≥VSPs or the condition of L≥Ls1 is satisfied, in step S16, a braking force is generated by operating brake unit 19 (brake actuator).

Accordingly, step S16 corresponds to a braking section of the present invention.

In next step S17, it is determined whether or not the vehicle body moving speed VSP is lower than the predetermined vehicle speed VSPs. Until the condition of VSP□VSPs is satisfied, in step S18, the braking force generated by operating brake unit 19 (brake actuator) is increased to further decrease the vehicle body moving speed VSP.

Accordingly, step S18 constitutes the braking section of the present invention together with the above-described step S16.

When the vehicle body moving speed VSP is lower than the predetermined vehicle speed VSPs, the logic flow proceeds to step S19 in which it is determined whether or not one of the following conditions (4) to (6) is satisfied. (4) The vehicle is moved by predetermined distance Ls2 or more when the charging cable is connected to the vehicle, that is, the vehicle body moving distance L is equal to or larger than the predetermined distance L2 (L≥Ls2) (wherein, Ls2>Ls1).

(5) Time ΔT for which the braking force control for restricting movement of the vehicle is executed has reached predetermined time ΔTs.

(6) A braking force increase/decrease pattern of the braking force control for restricting movement of the vehicle as explained later has repeated with a predetermined frequency. Here, the predetermined distance Ls2, the predetermined time ΔTs and the predetermined frequency of repetition of the braking force increase/decrease pattern are set values for determining whether or not the vehicle must be stopped for prevention of damage to the charging cable, or the like. Accordingly, step S19 corresponds to a vehicle body movement measuring section of the present invention.

When the condition of L□Ls2 and the condition of ΔT□ΔTs are satisfied, and the frequency of repetition of the braking force increase/decrease pattern is below the predetermined frequency, that is, when all the conditions (4) to (6) are not satisfied, the logic flow proceeds from step S19 to step S20.

In step S20, brake unit 19 (brake actuator) is operated such that after the braking force generated when the condition of VSP□VSPs is satisfied in step S17 is retained for definite time ΔTc, the braking force is cancelled or relaxed. Accordingly, step S20 corresponds to a braking section of the present invention.

After step S20 is executed, the logic flow goes back to step S14. Therefore, while the condition of VSP□VSPs is satisfied, the braking force cancel (or relax) state in step S20 is continued by a loop in which the logic flow returns to step S14 through step S22.

The braking force cancel (or relax) state is thus continued so that the condition of VSP≥VSPs is satisfied. After that, the vehicle body moving speed VSP is decreased to be lower than the predetermined vehicle speed VSPs by a loop in which the logic flow proceeds from step S14 to step S18. The logic flow then proceeds to step S19 and step S20.

By repeating the above-described cycle, while executing the braking force control for restricting movement of the vehicle during connection with the charging cable, the braking force is repetitively increased and decreased in the following pattern. When the control (based on the conditions of VSP≥VSPs or L≥Ls1) in transition from step S14 to step S16 is started, the braking force is increased such that the vehicle body moving speed VSP is decreased to be lower than the predetermined vehicle speed VSPs in step S17 and step S18, and the braking force is cancelled (or relaxed) after retaining the increased value of the braking force for the definite time ΔTc in step S20.

When the control (based on the conditions of VSP≥VSPs or L≥Ls1) in transition from step S14 to step S16 is started again, the braking force is increased such that the vehicle body moving speed VSP is decreased to be lower than the predetermined vehicle speed VSPs in step S17 and step S18, and the braking force is cancelled (or relaxed) after retaining the increased value of the braking force for the definite time ΔTc in step S20.

When the frequency of repetition of the braking force increase/decrease pattern has reached the predetermined frequency, the logic flow proceeds from step S19 to step S21. In step S21, the braking force is retained at a value at which the vehicle body moving speed VSP becomes 0 such that the vehicle can be prevented from moving. Accordingly, step S21 constitutes the braking section of the present invention together with step S16 and step S17 as described above.

In next step S22, it is determined whether or not one of the conditions (1) to (3) is satisfied, that is, whether or not an operation of stopping the vehicle (vehicle stop operation) by the driver has been carried out. When it is determined that the vehicle stop operation has been carried out, the braking force control for restricting movement of the vehicle is not necessary. Therefore, in step S23, in a case where the braking force control for restricting movement of the vehicle is during execution, the braking force control for restricting movement of the vehicle is cancelled.

Accordingly, step S22 corresponds to a vehicle stop operation detecting section.

However, in a case where in step S22, it is determined that the vehicle stop operation by the driver has not been carried out, the vehicle can move, and the braking force control for restricting movement of the vehicle is necessary. Therefore, the logic flow goes back to step S14, and the braking force control for restricting movement of the vehicle is continued.

In addition, in a case where in step S19, before the frequency of repetition of the braking force increase/decrease pattern has reached the predetermined frequency, it is determined that the above-described condition (4) is satisfied to indicate that the vehicle body moving distance L is equal to or larger than the predetermined distance Ls2 (L≥Ls2), or it is determined that the above-described condition (5) is satisfied to indicate that the time ΔT for the braking force control for restricting movement of the vehicle has reached the predetermined time ΔTs, the logic flow proceeds from step S19 to step S21. In step S21, the braking force is retained at a value at which the vehicle body moving speed VSP becomes 0 such that the vehicle can be prevented from moving. Subsequently, the logic flow proceeds to step S22 and step S23.

Incidentally, even in a case where in step S19, before the frequency of repetition of the braking force increase/decrease pattern has reached the predetermined frequency, the condition of L≥Ls2 is satisfied or the condition of ΔT≥ΔTs is satisfied, the logic flow proceeds to step S21 and step S22 to execute the above control.

<Functions/Effects>

The functions and effects of the above-described embodiment will be explained hereinafter based on Operation Examples 1-6 shown in FIGS. 3-8.

(a) Operation Example 1

Figure 3:
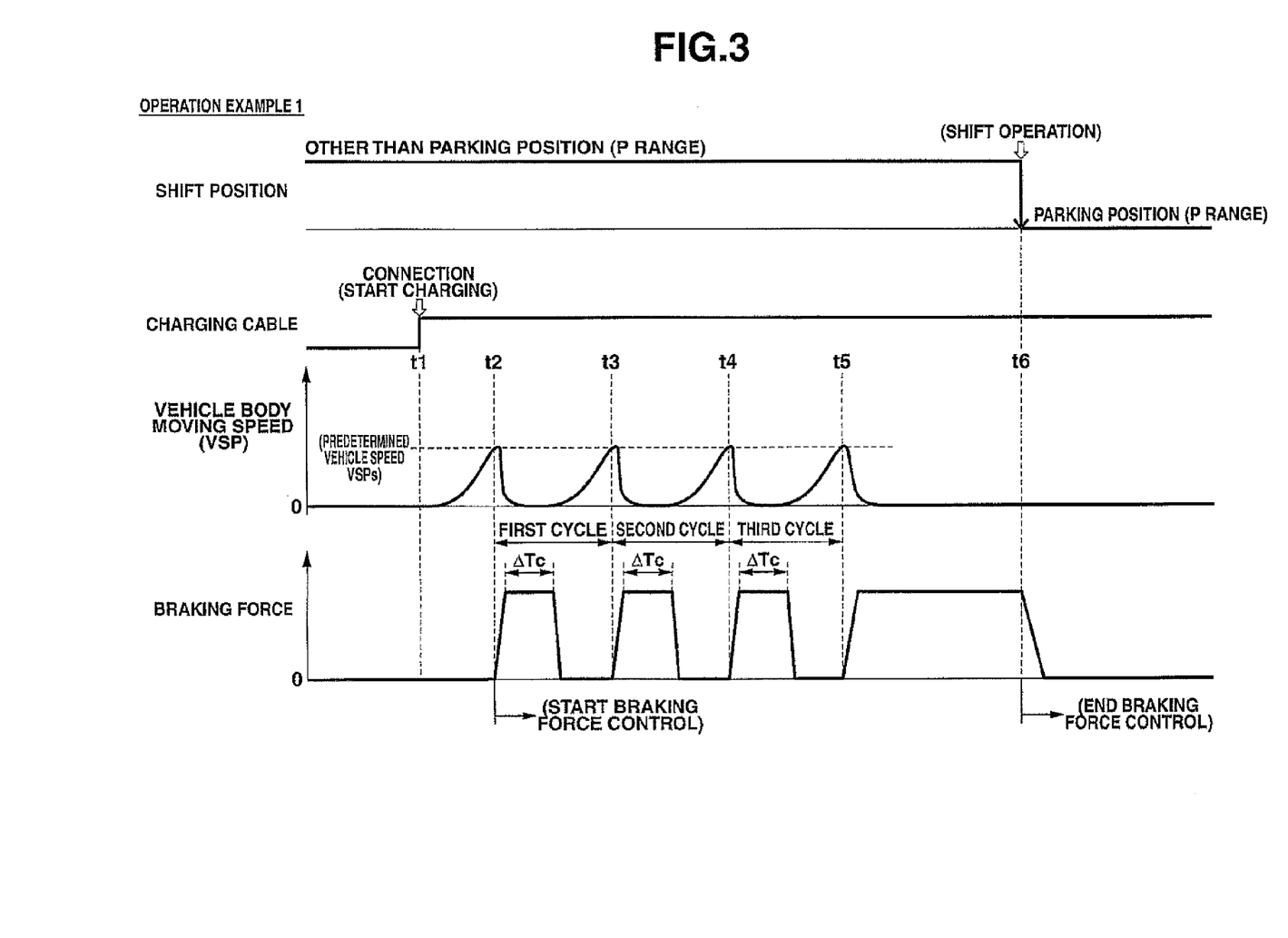
FIG. 3 is an operation time chart relating to Operation Example 1 of the braking force control program for restricting movement of a vehicle body during connection of the charging cable as shown in FIG. 2.

FIG. 3 is an operation time chart in a case where a driver forgets shifting to the parking position (P range) and exits from the vehicle while holding the shift position other than the parking position (P range), and connects charging cable 40 (33) to charging port 51 (52) to thereby start charging to battery 12.

Since the vehicle is not shifted to the parking position (P range) in such a case that the vehicle is stopped on a slope, the vehicle is allowed to move by a component of force of gravity so that the vehicle body moving speed VSP is generated, for instance, as shown in FIG. 3.

The braking force control is started by operating brake unit 19 such that a braking force is generated at instant t2 at which the vehicle body moving speed VSP becomes equal to or higher than the predetermined vehicle speed VSPs (step S14 and step S16). Then, the braking force is increased such that the vehicle body moving speed VSP becomes lower than the predetermined vehicle speed VSPs (such that in FIG. 3, VSP decreases to approximately 0) (step S17 and step S18).

When the condition of VSP☐VSPs is satisfied by the increased braking force, the braking force increased is retained for the definite time ΔTc, and after that, the braking force is cancelled or relaxed (step S20).

By thus cancelling or relaxing the braking force, the vehicle body moving speed VSP starts to rise again. However, initially, the condition of VSP☐VSPs is satisfied, and therefore, the loop in which the logic flow starts at step S14 and returns to step S14 through step S22 is repetitively executed, and an operation of brake unit 19 in step S16 to step S18 is not caused. As a result, the braking force is held at a value cancelled or reduced in step S20.

Therefore, at instant t3 at which the rising vehicle body moving speed VSP becomes equal to or higher than the predetermined vehicle speed VSPs, brake unit 19 is operated so as to generate the braking force again (step S16) and then increase the braking force such that the vehicle body moving speed VSP becomes lower than the predetermined vehicle speed VSPs (step S17 and step S18). When the condition of VSP☐VSPs is satisfied by the increased braking force, the braking force increased is retained for the definite time ΔTc, and after that, the braking force retained is cancelled or relaxed (step S20).

By thus cancelling or relaxing the braking force, the vehicle body moving speed VSP starts to rise again. However, initially, the condition of VSP☐VSPs is satisfied, and therefore, the loop in which the logic flow starts at step S14 and returns to step S14 through step S22 is repetitively executed, and the braking force is held at a value cancelled or reduced in step S20.

Therefore, after instant t4 at which the rising vehicle body moving speed VSP becomes equal to or higher than the predetermined vehicle speed VSPs, the braking force is generated again (step S16) and the braking force is increased such that the vehicle body moving speed VSP becomes lower than the predetermined vehicle speed VSPs (step S17 and step S18). When the condition of VSP☐VSPs is satisfied by the increased braking force, the braking force increased is retained for the definite time ΔTc, and after that, the braking force retained is cancelled or relaxed (step S20).

At instant t5 at which the braking force increase/decrease pattern is repeated at the predetermined frequency (in FIG. 3, three times) (step S19) by repetitively executing the braking force control as described above, the braking force is retained at a value at which the vehicle body moving speed VSP becomes 0 (step S21), so that the vehicle can be prevented from moving by the braking force.

Accordingly, when movement of the vehicle body (speed VSP) is detected while charging cable 40 (33) is in the connection state, the vehicle can be braked and stopped. As a result, it is possible to restrain the vehicle body from moving on a slope or the like due to forgetting shifting to the parking position (P range) regardless of the charging cable being in the connection state. Therefore, it is possible to attain a primary object to eliminate a problem that charging cable 40 (33) is damaged.

Figure 4:
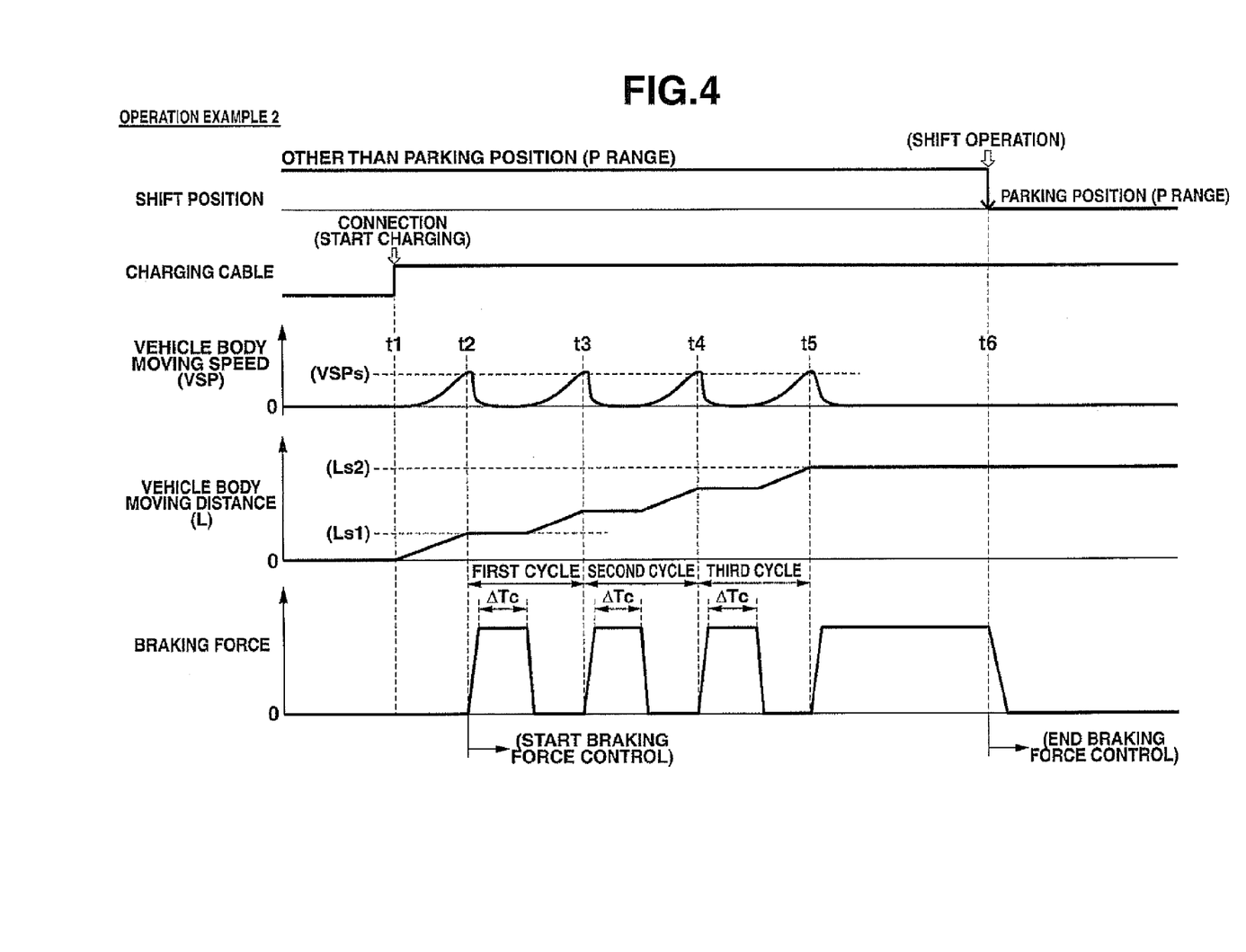
FIG. 4 is an operation time chart relating to Operation Example 2 of the braking force control program for restricting movement of vehicle body during connection of the charging cable as shown in FIG. 2.

Further, owing to the movement of the vehicle body which is caused until the time at which the vehicle is stopped, the driver can notice that shifting to the parking position (P range) is forgotten, and return to a vehicle cabin and then carry out shifting to the parking position (P range) at instant t6 as shown in FIG. 4.

Accordingly, the driver can be prevented from carrying out charging to the battery without noticing that the shifting to the parking position (P range) is forgotten. It is possible to avoid continuously carrying out the braking due to the charging conducted in a condition that the shifting to the parking position (P range) is forgotten. As a result, it is possible to avoid a problem concerning to overheating of brake unit 19 (brake actuator) and problems such as a prolonged charging time and an increased charging cost.

When the driver notices that shifting to the parking position (P range) is forgotten, and carries out the shifting at instant t6 shown in FIG. 3, the logic flow proceeds from step S22 to step S23 in which the above braking force control is cancelled and ended.

Further, as shown in FIG. 3, for a time period from instant t1 at which the braking force control is started to instant t5 at which the vehicle is stopped, the braking force is changed to increase and decrease with a predetermined pattern, and after this braking force increase/decrease pattern is repeated with the predetermined frequency (three times), the vehicle is allowed to stop. Therefore, as similar change patterns are repeated, the vehicle body moving speed VSP is also changed. It is possible to further surely alert the driver to notice that shifting to the parking position (P range) is forgotten. As a result, the above effects can be more remarkably enhanced.

At this time, in a case where the value of the braking force during decrease thereof is set to 0, a range of the change in the vehicle body moving speed VSP becomes larger so that the driver can be further surely alerted to notice that the shifting to the parking position (P range) is forgotten. As a result, the above effects can be more remarkably enhanced.

In addition, in a case where the braking force control time for which the vehicle body moving speed VSP becomes 0 is set for the above braking force increase/decrease pattern, the driver can return into the vehicle and surely carry out the shifting to the parking position (P range) forgotten with enough time during execution of the braking force control (VSP=0).

Further, upon executing the above braking force control, the braking force control is executed such that the vehicle body moving speed VSP becomes lower than the predetermined vehicle speed VSPs (step S17 and step S18). Accordingly, even upon carrying out charging to the battery in a case where the vehicle is located on a steep slope, it is possible to prevent the vehicle body moving speed VSP from becoming equal to or higher than the predetermined vehicle speed VSPs.

Accordingly, when the driver notices that the shifting to the parking position (P range) is forgotten as described above even upon carrying out charging to the battery in a case where the vehicle is located on a steep slope, the driver can return into the vehicle and surely carry out the shifting.

Further, after the above braking force increase/decrease pattern is repeated with the predetermined frequency (three times), the vehicle is allowed to stop (step S19 and step S21). Therefore, it is possible to ensure the effect of eliminating a problem of damaging charging cable 40 (33) by suitably selecting the predetermined frequency.

Furthermore, when such a shift operation as to stop the vehicle is carried out, the above braking force control is ended (step S22 and step S23). Accordingly, it is possible to suppress unnecessarily continuously executing the braking force control notwithstanding no movement of the vehicle. Therefore, the problem due to overheating of the brake actuator can be avoided, and useless electric power consumption can be avoided.

(b) Operation Example 2

FIG. 4 is an operation time chart in a case where a driver forgets shifting to the parking position (P range) and exits from the vehicle while holding the shift position other than the parking position (P range), and connects charging cable 40 (33) to charging port 51 (52) at instant t1 to thereby start charging to battery 12.

Since the vehicle is not held at the parking position (P range), in a case where the vehicle is stopped on a slope, the vehicle is allowed to move by a component of force of gravity so that the vehicle body moving speed VSP and the vehicle body moving distance L are generated, for instance, as shown in FIG. 4.

The braking force control is started by operating brake unit 19 such that a braking force is generated at instant t2 at which the vehicle body moving distance L becomes equal to or larger than the predetermined distance Ls1 (step S14 and step S16). Then, in the operation example shown in FIG. 4, the vehicle body moving speed VSP at instant t2 at which the braking force control is started is defined as the predetermined vehicle speed VSPs, and the thus defined predetermined vehicle speed VSPs is used for determination in step S17.

Thus, in the operation example shown in FIG. 4, at instant t2, the braking force generated in step S16 is increased such that the vehicle body moving speed VSP becomes lower than the vehicle speed value (predetermined vehicle speed VSPs) which has been generated at instant t2 (in FIG. 4, such that VSP is decreased to approximately 0) (step S17 and step S18).

When the condition of VSP☐VSPs is satisfied by the increased braking force, the braking force increased is retained for the definite time ΔTc, and after that, the braking force is cancelled or relaxed (step S20).

By thus cancelling or relaxing the braking force, the vehicle body moving speed VSP starts to rise again. However, initially, the condition of VSP☐VSPs is satisfied, and therefore, the loop in which the logic flow starts at step S14 and goes to step S22 and back to step S14 is repetitively executed, and an operation of brake unit 19 in step S16 to step S18 is not caused. As a result, the braking force is held at a value cancelled or reduced in step S20.

Therefore, at instant t3 at which the rising vehicle body moving speed VSP becomes equal to or higher than the predetermined vehicle speed VSPs, brake unit 19 is operated so as to generate the braking force again (step S16) and then increase the braking force such that the vehicle body moving speed VSP becomes lower than the predetermined vehicle speed VSPs (step S17 and step S18). When the condition of VSP☐VSPs is satisfied by the increased braking force, the braking force increased is retained for the definite time ΔTc, and after that, the braking force retained is cancelled or relaxed (step S20).

By thus cancelling or relaxing the braking force, the vehicle body moving speed VSP starts to rise again. However, initially, the condition of VSP☐VSPs is satisfied, and therefore, the loop in which the logic flow starts at step S14 and goes to step S22 and back to step S14 is repetitively executed, and the braking force is held at a value cancelled or reduced in step S20.

Therefore, after instant t4 at which the rising vehicle body moving speed VSP becomes equal to or higher than the predetermined vehicle speed VSPs, the braking force is generated again (step S16) and the braking force is increased such that the vehicle body moving speed VSP becomes lower than the predetermined vehicle speed VSPs (step S17 and step S18). When the condition of VSP☐VSPs is satisfied by the increased braking force, the braking force increased is retained for the definite time ΔTc, and after that, the braking force retained is cancelled or relaxed (step S20).

At instant t5 at which the braking force increase/decrease pattern is repeated at the predetermined frequency (in FIG. 4, three times) (step S19) by repetitively executing the braking force control as described above (in FIG. 4, at the same time as the instant at which the vehicle body moving distance L becomes equal to the predetermined distance Ls2), the braking force is retained at a value at which the vehicle body moving speed VSP becomes 0 (step S21), so that the vehicle can be prevented from moving by the braking force.

Accordingly, when movement of the vehicle body (speed VSP) is detected while charging cable 40 (33) is in the connection state, the vehicle can be braked and stopped. As a result, it is possible to restrain the vehicle body from moving on a slope or the like due to forgetting shifting to the parking position (P range) regardless of the charging cable being in the connection state. Therefore, it is possible to attain a primary object to eliminate a problem that charging cable 40 (33) is damaged.

Further, owing to the movement of the vehicle body which is caused until the time at which the vehicle is stopped, the driver can notice that shifting to the parking position (P range) is forgotten, and return to a vehicle cabin and then carry out shifting to the parking position (P range) similarly to done at instant t6 as shown in FIG. 3. Accordingly, the driver can be prevented from carrying out charging to the battery without noticing that the shifting to the parking position (P range) is forgotten. It is possible to avoid continuously carrying out the braking due to the charging conducted in a condition that the shifting to the parking position (P range) is forgotten. As a result, it is possible to avoid a problem concerning to overheating of brake unit 19 (brake actuator) and problems such as a prolonged charging time and an increased charging cost.

When the driver notices that shifting to the parking position (P range) is forgotten, and carries out the shifting at instant t6 shown in FIG. 4, the logic flow proceeds from step S22 to step S23 in which the above braking force control is cancelled and ended.

Further, as shown in FIG. 4, for a time period from instant t1 at which the braking force control is started to instant t5 at which the vehicle is stopped, the braking force is changed to increase and decrease with a predetermined pattern, and after this braking force increase/decrease pattern is repeated with the predetermined frequency (three times), the vehicle is allowed to stop. Therefore, as similar change patterns are repeated, the vehicle body moving speed VSP is also changed. It is possible to further surely alert the driver to notice that shifting to the parking position (P range) is forgotten. As a result, the above effects can be more remarkably enhanced.

At this time, in a case where the value of the braking force during decrease thereof is set to 0, a range of the change in the vehicle body moving speed VSP becomes higher so that the driver can be further surely alerted to notice that the shifting to the parking position (P range) is forgotten. As a result, the above effects can be more remarkably enhanced.

In addition, in a case where the braking force control time for which the vehicle body moving speed VSP becomes 0 is set for the above braking force increase/decrease pattern, the driver can return into the vehicle and surely carry out the shifting to the parking position (P range) forgotten with enough time during execution of the braking force control (VSP=0).

Further, upon executing the above braking force control, the braking force control is executed such that the vehicle body moving speed VSP becomes lower than the predetermined vehicle speed VSPs (step S17 and step S18). Accordingly, even upon carrying out charging to the battery in a case where the vehicle is located on a steep slope, it is possible to prevent the vehicle body moving speed VSP from becoming equal to or higher than the predetermined vehicle speed VSPs.

Accordingly, when the driver notices that the shifting to the parking position (P range) is forgotten as described above even upon carrying out charging to the battery in a case where the vehicle is located on a steep slope, the driver can return into the vehicle and surely carry out the shifting.

Further, after the above braking force increase/decrease pattern is repeated with the predetermined frequency (three times), or when the vehicle body moving distance L becomes equal to the predetermined distance Ls2 (also, when vehicle body moving time ΔT becomes equal to predetermined time ΔTs), the vehicle is allowed to stop (step S19 and step S21). Therefore, it is possible to ensure the effect of eliminating a problem of damaging charging cable 40 (33) by suitably selecting the predetermined frequency, the predetermined distance Ls2 or predetermined time ΔTs.

Furthermore, when such a shift operation as to stop the vehicle is carried out, the above braking force control is ended (step S22 and step S23). Accordingly, it is possible to suppress unnecessarily continuously executing the braking force control notwithstanding no movement of the vehicle. Therefore, the problem due to overheating of the brake actuator can be avoided, and useless electric power consumption can be avoided.

(c) Operation Example 3

Figure 5:
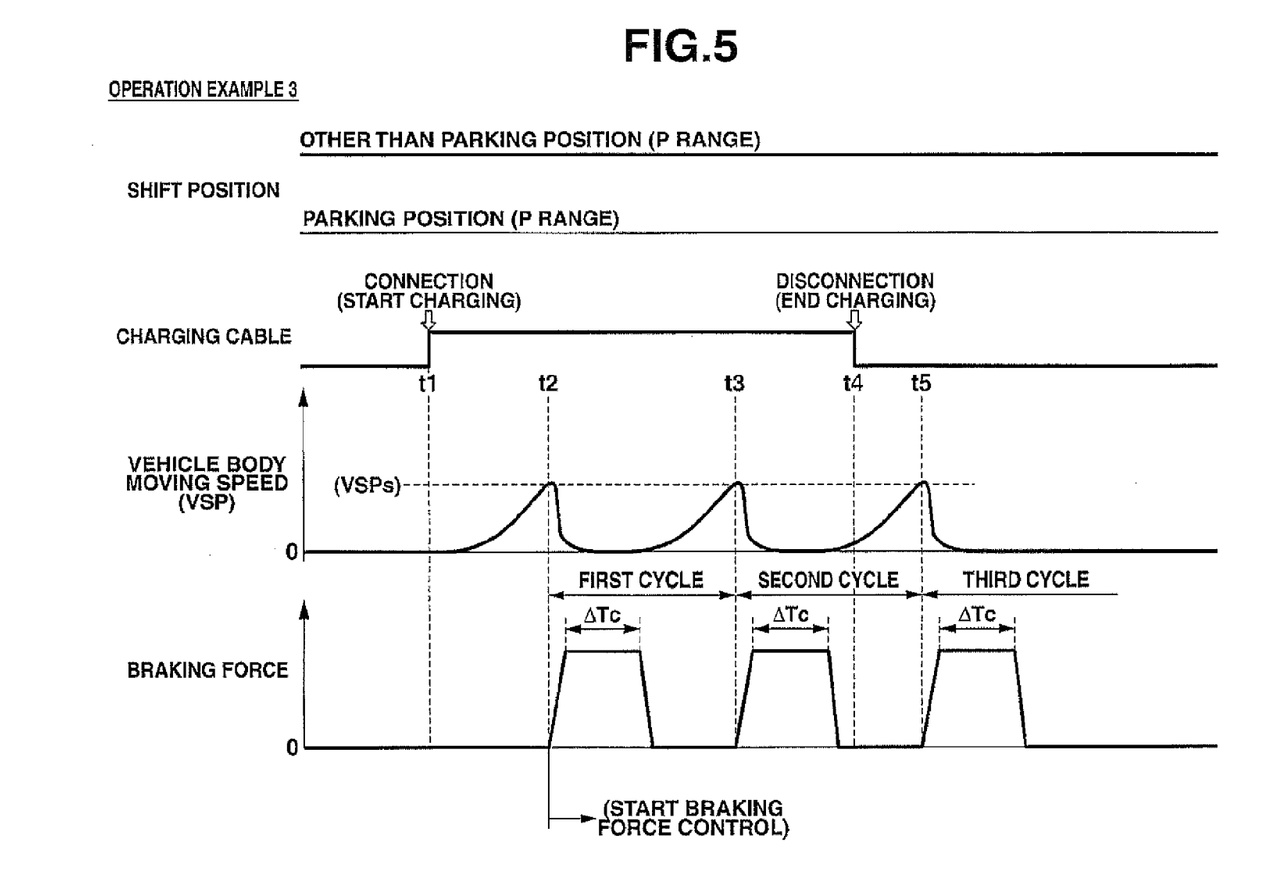
FIG. 5 is an operation time chart relating to Operation Example 3 of the braking force control program for restricting movement of a vehicle body during connection of the charging cable as shown in FIG. 2.

FIG. 5 is an operation time chart in a case where a driver forgets shifting to the parking position (P range) and exits from the vehicle while holding the shift position other than the parking position (P range), and at instant t1, connects charging cable 40 (33) to charging port 51 (52) to thereby start charging to battery 12.

The operation example of FIG. 5 is a time chart in a case where the braking force control is executed similarly to the operation example of FIG. 3. However, FIG. 5 shows the operation in a case where the first cycle as an initial braking force increase/decrease pattern for a time period from instant t2 at which the braking force control is started to instant t3 is ended, and charging cable 40 (33) is disconnected from charging port 51 (52) to end the charging during the second cycle (at instant t4) which is a next braking force increase/decrease pattern for a time period from instant t3 to instant t5.

As shown at instant t2 and after in FIG. 5, once the braking force control is started in response to detection of movement of the vehicle body in the connection state of the charging cable (step S14 to step S22), even though charging cable 40 (33) is disconnected from charging port 51 (52) to end the charging during execution of the braking force control as shown at instant t4, there exists no loop to return to step S11 in which connection of the charging cable is determined, and merely a loop including step S14 to step S22 is repeated. Therefore, even after instant t4, the above braking force control can be subsequently executed as indicated by braking force waveforms in FIG. 5.

Accordingly, at instant t4 at which the charging cable is disconnected, the braking force control is prevented from being forcibly ended, so that the vehicle is prevented from rapidly moving, thereby considerably serving for safety.

(d) Operation Example 4

Figure 6:
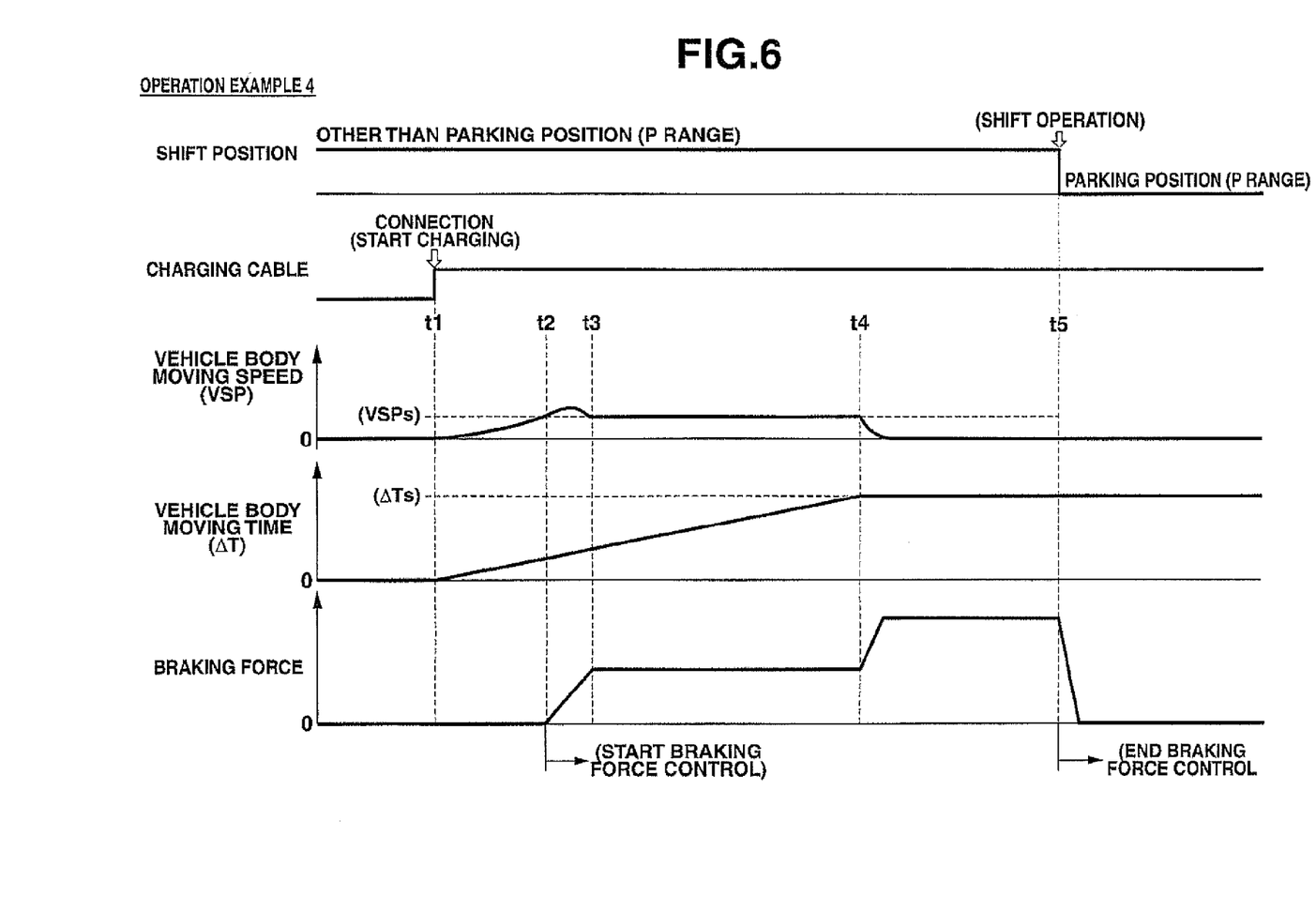
FIG. 6 is an operation time chart relating to Operation Example 4 of the braking force control program for restricting movement of a vehicle body during connection of the charging cable as shown in FIG. 2.

FIG. 6 is an operation time chart in a case where a driver forgets shifting to the parking position (P range) and exits from the vehicle while holding the shift position other than the parking position (P range), and connects charging cable 40 (33) to charging port 51 (52) at instant t1 to thereby start charging to battery 12.

Since the vehicle is not shifted to the parking position (P range) in such a case that the vehicle is stopped on a slope, the vehicle is allowed to move by a component of force of gravity so that the vehicle body moving speed VSP and the vehicle body moving time ΔT are generated, for instance, as shown in FIG. 6.

The braking force control is started by operating brake unit 19 such that a braking force is generated at instant t2 at which the vehicle body moving speed VSP becomes equal to or higher than the predetermined vehicle speed VSPs (step S14 and step S16). Then, the braking force generated is increased such that the vehicle body moving speed VSP becomes lower than the predetermined vehicle speed VSPs (step S17 and step S18).

Figure 2:
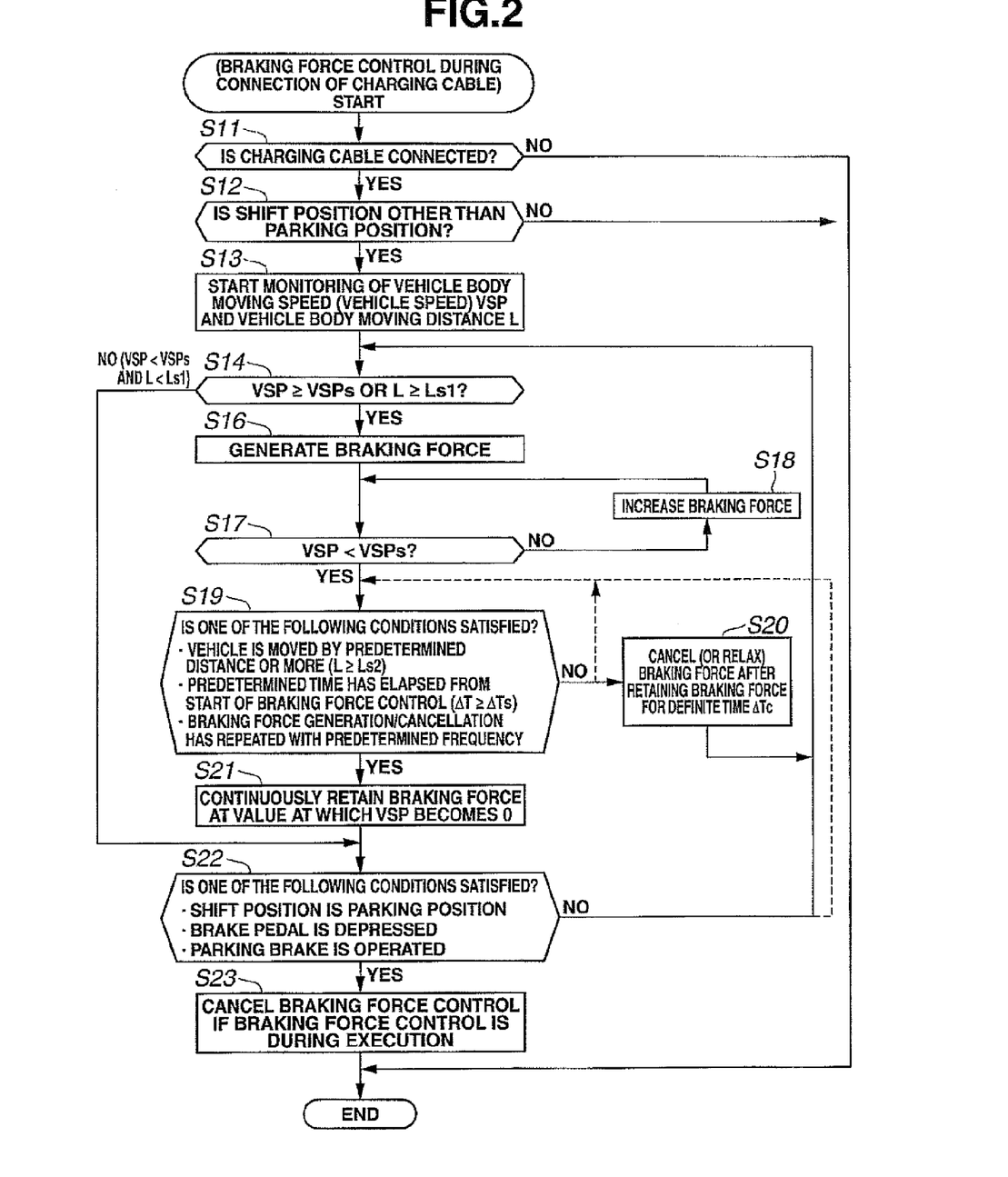
FIG. 2 is a flow chart showing a braking force control program for restricting movement of a vehicle body during connection of the charging cable, which is executed by a vehicle controller shown in FIG. 1.

Incidentally, in the operation example of FIG. 6, step S20 in FIG. 2 is omitted, and in step S19 in FIG. 2 which is selected when it is determined that the condition of VSP☐VSPs is satisfied in step S17, when the answer in step S19 is "No", the determination in step S19 is repeated as indicated by broken line such that the standby state is held. In addition, when the answer in step S22 is "No", the logic flow returns from step S22 to step S19 as indicated by broken line.

As a result, as shown at instant t3 in FIG. 6, once the condition of VSP☐VSPs is satisfied by the braking force increased as described above, the braking force at instant t3 after being increased is continuously retained even after instant t3, so that the vehicle body moving speed VSP can be maintained below predetermined vehicle speed VSPs.

When the vehicle body moving time ΔT becomes equal to the predetermined time ΔTs at instant t4 under the condition that the vehicle body moving speed VSP is maintained below predetermined vehicle speed VSPs by the above-described braking force control (step S19), the braking force is retained at the value at which the vehicle body moving speed VSP becomes 0 (step S21), so that the vehicle body can be restrained from moving by the braking force.

Accordingly, when movement of the vehicle body (speed VSP) is detected while charging cable 40 (33) is in the connection state, the vehicle can be braked and stopped. As a result, it is possible to restrain the vehicle body from moving on a slope or the like due to forgetting shifting to the parking position (P range) regardless of the charging cable being in the connection state. Therefore, it is possible to attain a primary object to eliminate a problem that charging cable 40 (33) is damaged.

Further, owing to the movement of the vehicle body which is caused until the time at which the vehicle is stopped, the driver can notice that shifting to the parking position (P range) is forgotten, and return to a vehicle cabin and then carry out shifting to the parking position (P range) at instant t5 as shown in FIG. 6.

Accordingly, the driver can be prevented from carrying out charging to the battery without noticing that the shifting to the parking position (P range) is forgotten. It is possible to avoid continuously carrying out the braking due to the charging conducted in a condition that the shifting to the parking position (P range) is forgotten. As a result, it is possible to avoid a problem concerning to overheating of brake unit 19 (brake actuator) and problems such as a prolonged charging time and an increased charging cost.

When the driver notices that shifting to the parking position (P range) is forgotten, and carries out the shifting at instant t5 shown in FIG. 6, the logic flow proceeds from step S22 to step S23 in which the above braking force control is cancelled and ended.

Further, upon executing the above braking force control, the braking force control is executed such that the vehicle body moving speed VSP becomes lower than the predetermined vehicle speed VSPs (step S17 and step S18). Accordingly, even upon carrying out charging to the battery in a case where the vehicle is located on a steep slope, it is possible to prevent the vehicle body moving speed VSP from becoming equal to or higher than the predetermined vehicle speed VSPs.

Accordingly, when the driver notices that the shifting to the parking position (P range) is forgotten as described above even upon carrying out charging to the battery in a case where the vehicle is located on a steep slope, the driver can return into the vehicle and surely carry out the shifting.

Further, at instant t4 at which the vehicle body moving time ΔT becomes equal to the predetermined time ΔTs, the vehicle is allowed to stop (step S19 and step S21). Therefore, it is possible to ensure the effect of eliminating a problem of damaging charging cable 40 (33) by suitably selecting the predetermined time ΔTs.

Furthermore, when such a shift operation as to stop the vehicle is carried out, the above braking force control is ended (step S22 and step S23). Accordingly, it is possible to suppress unnecessarily continuously executing the braking force control notwithstanding no movement of the vehicle. Therefore, the problem due to overheating of the brake actuator can be avoided, and useless electric power consumption can be avoided.

(e) Operation Example 5

Figure 7:
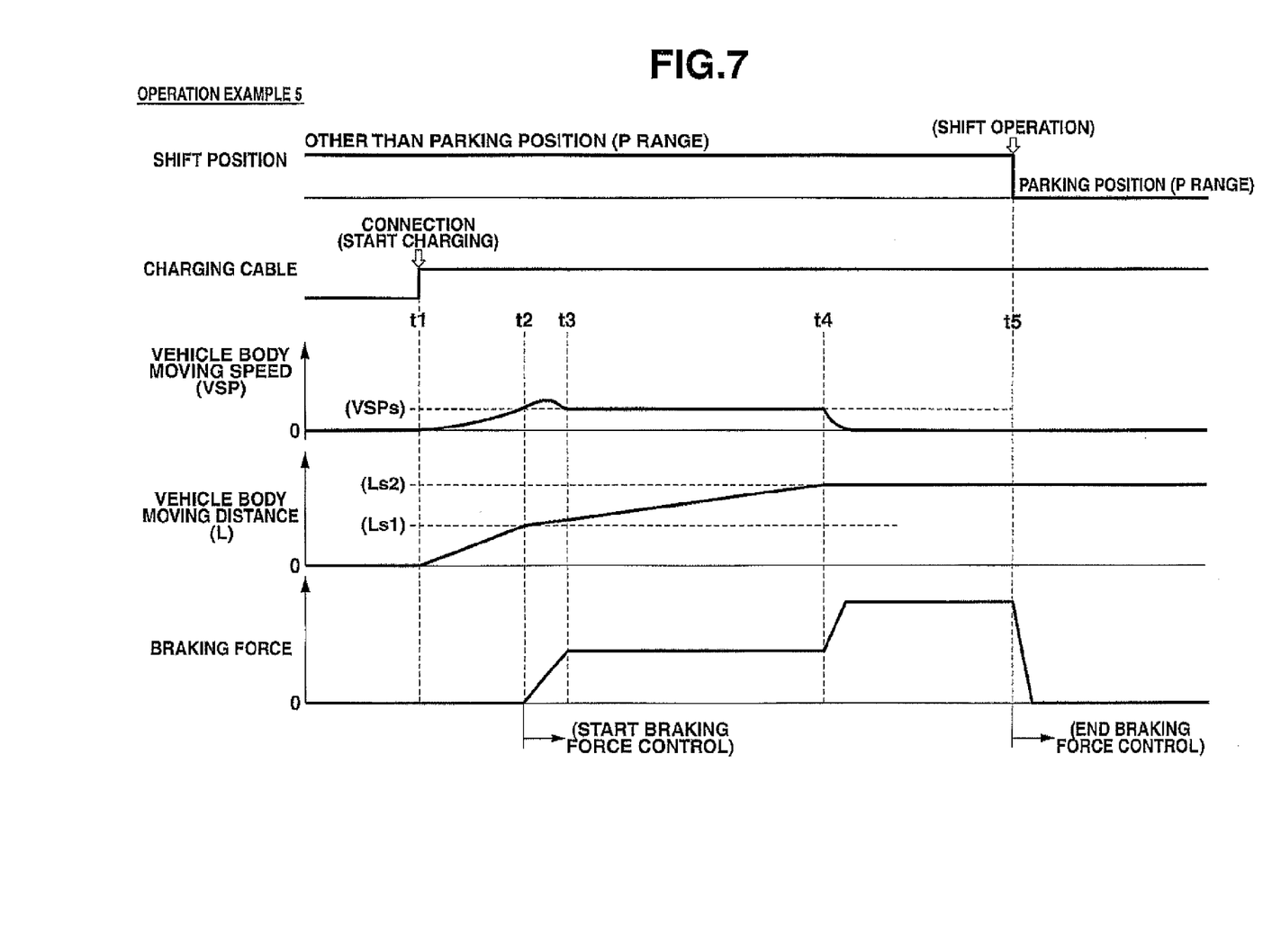
FIG. 7 is an operation time chart relating to Operation Example 5 of the braking force control program for restricting movement of a vehicle body during connection of the charging cable as shown in FIG. 2.

FIG. 7 is an operation time chart in a case where a driver forgets shifting to the parking position (P range) and exits from the vehicle while holding the shift position other than the parking position (P range), and connects charging cable 40 (33) to charging port 51 (52) at instant t1 to thereby start charging to battery 12.

Since the vehicle is not shifted to the parking position (P range) in such a case that the vehicle is stopped on a slope, the vehicle is allowed to move by a component of force of gravity so that the vehicle body moving speed VSP and the vehicle body moving distance L are generated, for instance, as shown in FIG. 7.

The braking force control is started by operating brake unit 19 such that a braking force is generated at instant t2 at which the vehicle body moving distance L becomes equal to or larger than the predetermined distance Ls1 (step S14 and step S16). Then, the braking force generated is increased such that the vehicle body moving speed VSP becomes lower than the predetermined vehicle speed VSPs (step S17 and step S18).

Incidentally, similarly to the operation example of FIG. 6, in the operation example of FIG. 7, step S20 in FIG. 2 is omitted, and in step S19 in FIG. 2 which is selected when it is determined that the condition of VSP☐VSPs is satisfied in step S17, when the answer in step S19 is "No", the determination in step S19 is repeated as indicated by broken line such that the standby state is held. In addition, when the answer in step S22 is "No", the logic flow returns from step S22 to step S19 as indicated by broken line.

As a result, as shown at instant t3 in FIG. 7, once the condition of VSP☐VSPs is satisfied by the braking force increased as described above, the braking force at instant t3 after being increased is continuously retained even after instant t3, so that the vehicle body moving speed VSP can be maintained below predetermined vehicle speed VSPs.

When the vehicle body moving distance L becomes equal to the predetermined distance Ls2 at instant t4 under the condition that the vehicle body moving speed VSP is maintained below predetermined vehicle speed VSPs by the above-described braking force control (step S19), the braking force is retained at the value at which the vehicle body moving speed VSP becomes 0 (step S21), so that the vehicle body can be restrained from moving by the braking force.

Accordingly, when movement of the vehicle body (speed VSP) is detected while charging cable 40 (33) is in the connection state, the vehicle can be braked and stopped. As a result, it is possible to restrain the vehicle body from moving on a slope or the like due to forgetting shifting to the parking position (P range) regardless of the charging cable being in the connection state. Therefore, it is possible to attain a primary object to eliminate a problem that charging cable 40 (33) is damaged.

Further, owing to the movement of the vehicle body which is caused until the time at which the vehicle is stopped, the driver can notice that shifting to the parking position (P range) is forgotten, and return to a vehicle cabin and then carry out shifting to the parking position (P range) at instant t5 as shown in FIG. 6.

Accordingly, the driver can be prevented from carrying out charging to the battery without noticing that the shifting to the parking position (P range) is forgotten. It is possible to avoid continuously carrying out the braking due to the charging conducted in a condition that the shifting to the parking position (P range) is forgotten. As a result, it is possible to avoid a problem concerning to overheating of brake unit 19 (brake actuator) and problems such as a prolonged charging time and an increased charging cost.

When the driver notices that shifting to the parking position (P range) is forgotten, and carries out the shifting at instant t5 shown in FIG. 7, the logic flow proceeds from step S22 to step S23 in which the above braking force control is cancelled and ended.

Further, upon executing the above braking force control, the braking force control is executed such that the vehicle body moving speed VSP becomes lower than the predetermined vehicle speed VSPs (step S17 and step S18). Accordingly, even upon carrying out charging to the battery in a case where the vehicle is located on a steep slope, it is possible to prevent the vehicle body moving speed VSP from becoming equal to or higher than the predetermined vehicle speed VSPs.

Accordingly, when the driver notices that the shifting to the parking position (P range) is forgotten as described above even upon carrying out charging to the battery in a case where the vehicle is located on a steep slope, the driver can return into the vehicle and surely carry out the shifting.

Further, at instant t4 at which the vehicle body moving distance L becomes equal to the predetermined distance Ls2, the vehicle is allowed to stop (step S19 and step S21). Therefore, it is possible to ensure the effect of eliminating a problem of damaging charging cable 40 (33) by suitably selecting the predetermined distance Ls2.

Furthermore, when such a shift operation as to stop the vehicle is carried out, the above braking force control is ended (step S22 and step S23). Accordingly, it is possible to suppress unnecessarily continuously executing the braking force control notwithstanding no movement of the vehicle. Therefore, the problem due to overheating of the brake actuator can be avoided, and useless electric power consumption can be avoided.

(f) Operation Example 6

Figure 8:
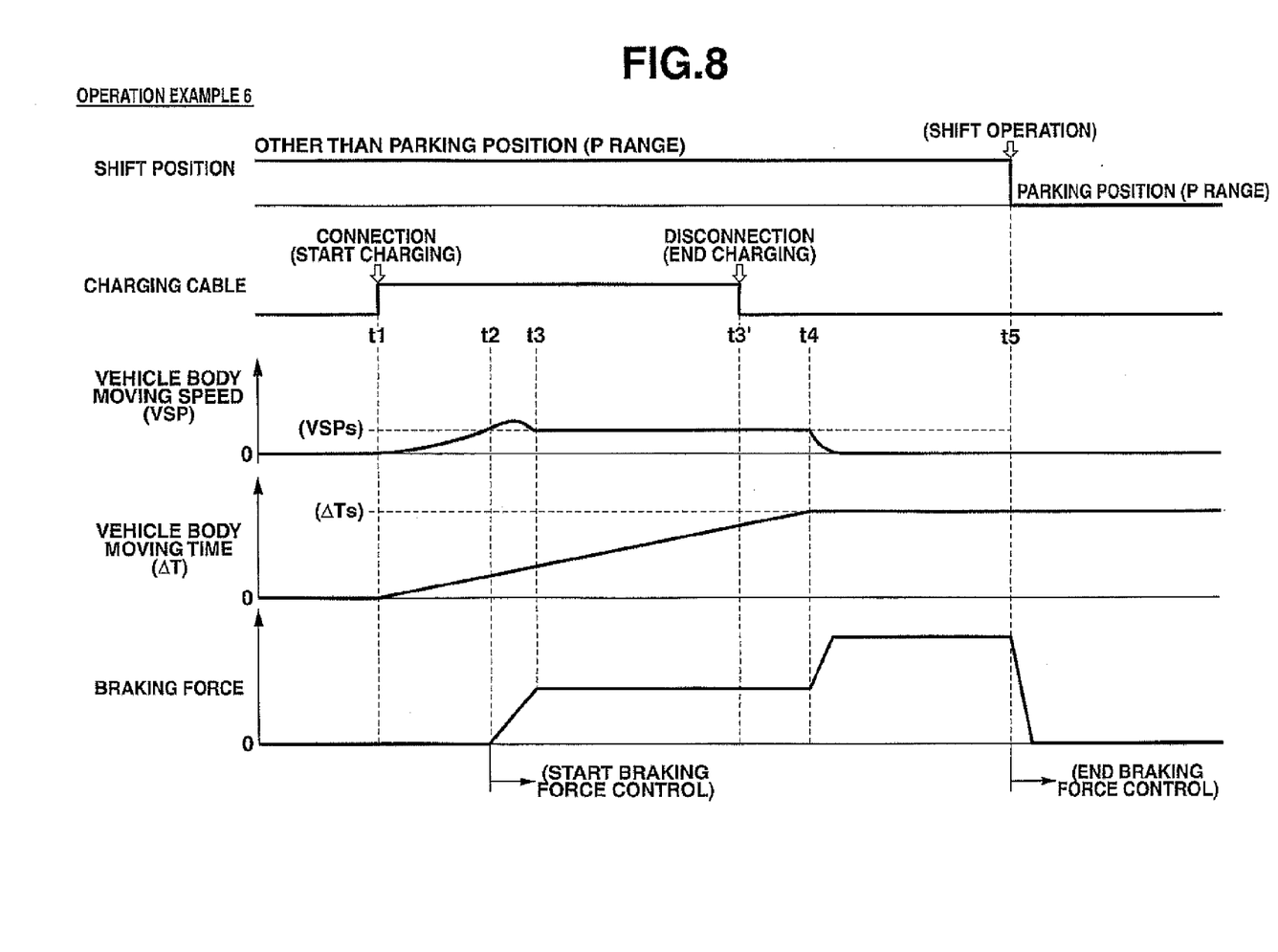
FIG. 8 is an operation time chart relating to Operation Example 6 of the braking force control program for restricting movement of a vehicle body during connection of the charging cable as shown in FIG. 2.

FIG. 8 is an operation time chart in a case where a driver forgets shifting to the parking position (P range) and exits from the vehicle while holding the shift position other than the parking position (P range), and connects charging cable 40 (33) to charging port 51 (52) at instant t1 to thereby start charging to battery 12.

The operation example of FIG. 8 is a time chart in a case where the braking force control is executed similarly to the operation example of FIG. 6. However, FIG. 8 shows the operation in a case where charging cable 40 (33) is disconnected from charging port 51 (52) to end the charging at instant t3' within a time period from time t2 at which the braking force control is started to time t5 at which the braking force control is ended for which the braking force control is executed.

As shown at instant t2 and after in FIG. 8, once the braking force control is started in response to detection of movement of the vehicle body in the connection state of the charging cable (step S14 to step S22), even though charging cable 40 (33) is disconnected from charging port 51 (52) to end the charging during execution of the braking force control as shown at instant t3', there exists no loop to return to step S11 in which connection of the charging cable is determined, and merely a loop including step S14 to step S22 (except for step S20) is repeated. Therefore, even after instant t3', the above braking force control can be subsequently executed as indicated by braking force waveforms in FIG. 8.

Accordingly, at instant t3' at which the charging cable is disconnected, the braking force control is prevented from being forcibly ended, so that the vehicle is prevented from rapidly moving, thereby considerably serving for safety.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 electric vehicle (vehicle)
11 electric motor
12 high-power battery
13 vehicle controller
14 inverter
15 shift unit
15a shift position sensor
16 high-power auxiliary machinery system
17 low-power auxiliary machinery system
18 DC-DC converter
19 brake unit (brake actuator)
20 external power source
21 commercial power source
22 power receptacle
30 external charging device
31 battery charger
32 charging gun
33 charging cable
40 charging cable
41 power plug
42 control box
43 charging gun
51, 52 charging port
53 power supply device
54 battery relay
55 battery controller
56 charging relay

The invention claimed is:

1. A device for restricting movement of a vehicle during connection of a charging cable, the vehicle being equipped with a battery chargeable from an external power source via the charging cable, the device comprising:
a vehicle controller comprising:
a charging cable connection detector that detects whether the charging cable is in a connection state;
a vehicle body movement detector that detects movement of a vehicle body of the vehicle based on moving speed or moving distance of the vehicle; and
a braking controller that executes braking force control so as to brake the vehicle when the movement of the vehicle body is detected while the charging cable is in the connection state based on signals from the charging cable connection detector and the vehicle body movement detector,
wherein the braking controller executes the braking force control such that vehicle body moving speed is changed to increase and decrease repeatedly in a predetermined pattern.

2. The device for restricting movement of a vehicle during connection of a charging cable as claimed in claim 1,
wherein the braking controller executes the braking force control such that a predetermined pattern in which the vehicle body moving speed is changed between a set speed and 0 is repeated.

3. The device for restricting movement of a vehicle during connection of a charging cable as claimed in claim 1,
wherein the vehicle controller further comprises:
a vehicle body movement measuring section that measures vehicle body moving distance or vehicle body moving time during braking by the braking controller, and wherein the braking controller controls braking force such that movement of the vehicle body is not caused when the vehicle body moving distance measured reaches a predetermined distance or the vehicle body moving time measured reaches a predetermined time, or when the predetermined pattern of the vehicle body moving speed is repeated with a predetermined frequency.

4. The device for restricting movement of a vehicle during connection of a charging cable as claimed in claim 1,
wherein, once the braking force control is started by detecting the movement of the vehicle body while the charging cable is in the connection state, the braking controller continuously executes the braking force control without interruption even when the charging cable is disconnected from the vehicle.

5. The device for restricting movement of a vehicle during connection of a charging cable as claimed in claim 1,
wherein the vehicle controller further comprises a vehicle stop operation detector that detects a manual operation to restrain movement of the vehicle body,
wherein, when the manual operation is detected by the vehicle stop operation detector, the braking controller ends the braking force control started by detecting the movement of the vehicle body while the charging cable is in the connection state.

6. The device for estricting movement of a vehicle during connection of a charging cable as claimed in claim 5,
wherein the vehicle stop operation detector detects at least one of a shift operation to establish a parking state of the vehicle, an operation of a parking brake of the vehicle, and an operation of a brake pedal of the vehicle as the manual operation.

7. A device for restricting movement of a vehicle during connection of a charging cable, the vehicle being equipped with a battery chargeable from an external power source via the charging cable, the device comprising:
a charging cable connection detecting means for detecting that the charging cable is in a connection state;
a vehicle body movement detecting means for detecting movement of a vehicle body of the vehicle based on moving speed or moving distance of the vehicle; and
a braking means for executing braking force control so as to brake the vehicle when the movement of the vehicle body is detected while the charging cable is in the connection state based on signals from the charging cable connection detecting means and the vehicle body movement detecting means, and
wherein the braking means executes the braking force control such that vehicle body moving speed is changed to increase and decrease repeatedly in a predetermined pattern.

* * * * *